United States Patent
Bardin et al.

(10) Patent No.: US 11,776,018 B2
(45) Date of Patent: *Oct. 3, 2023

(54) UNIVERSAL AD CREATIVE

(71) Applicant: Google LLC, Mountain View, CA (US)

(72) Inventors: Ariel H. Bardin, Belmont, CA (US); Rachel Garb, Mountain View, CA (US); Mohammed Abdoolcarim, Palo Alto, CA (US); Si Shen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,671

(22) Filed: Mar. 16, 2022

(65) Prior Publication Data

US 2022/0207569 A1 Jun. 30, 2022

Related U.S. Application Data

(63) Continuation of application No. 16/021,221, filed on Jun. 28, 2018, now Pat. No. 11,436,643, which is a continuation of application No. 12/016,606, filed on Jan. 18, 2008, now abandoned.

(51) Int. Cl.
*G06Q 30/00* (2023.01)
*G06Q 30/0273* (2023.01)
*G06Q 30/02* (2023.01)

(52) U.S. Cl.
CPC ......... *G06Q 30/0273* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 5,724,521 | A | 3/1998 | Dedrick |
| 5,740,549 | A | 4/1998 | Reilly et al. |
| 5,848,397 | A | 12/1998 | Marsh et al. |
| 5,948,061 | A | 9/1999 | Merriman |
| 6,026,368 | A | 2/2000 | Brown et al. |

(Continued)

FOREIGN PATENT DOCUMENTS

| | | |
|---|---|---|
| EP | 2248089 | 8/2015 |
| JP | 2007-317148 | 12/2007 |

(Continued)

OTHER PUBLICATIONS

95/001,073, Sep. 30, 2004, Reexamination of Stone et al.

(Continued)

*Primary Examiner* — Naresh Vig
(74) *Attorney, Agent, or Firm* — Fish & Richardson P.C.

(57) ABSTRACT

Methods for generating one or more advertisement creatives for multiple advertisement types. In one aspect, a method includes receiving a selection and data entered in an electronic form, the selection being for two or more different advertisement types, the entered data being of one or more data types, the data types including text, image, audio, or video, generating two or more advertisement creatives using the entered data, the two or more advertisement creatives being for the selected two or more different advertisement types, and presenting the two or more advertisement creatives.

20 Claims, 7 Drawing Sheets

(56) References Cited

U.S. PATENT DOCUMENTS

| | | | |
|---|---|---|---|
| 6,044,376 | A | 3/2000 | Kurtzman, II |
| 6,078,914 | A | 6/2000 | Redfern |
| 6,144,944 | A | 11/2000 | Kurtzman, II et al. |
| 6,167,382 | A | 12/2000 | Sparks et al. |
| 6,269,361 | B1 | 7/2001 | Davis et al. |
| 6,401,075 | B1 | 6/2002 | Mason et al. |
| 6,985,882 | B1 | 1/2006 | Del Sesto |
| 7,136,875 | B2 | 1/2006 | Anderson et al. |
| 7,039,599 | B2 | 5/2006 | Merriman |
| 2005/0216335 | A1 | 9/2005 | Fikes et al. |
| 2005/0222901 | A1 | 10/2005 | Agarwal et al. |
| 2006/0282314 | A1 | 12/2006 | Zamanian et al. |
| 2007/0022003 | A1* | 1/2007 | Chao ............... G06Q 30/0269 705/14.69 |
| 2007/0027864 | A1 | 2/2007 | Collins et al. |
| 2007/0073583 | A1 | 3/2007 | Grouf et al. |
| 2007/0073584 | A1 | 3/2007 | Grouf et al. |
| 2007/0130007 | A1 | 6/2007 | Haberman et al. |
| 2007/0130014 | A1 | 6/2007 | Altberg et al. |
| 2007/0156525 | A1 | 7/2007 | Grouf et al. |
| 2007/0300152 | A1 | 12/2007 | Baugher |
| 2008/0004956 | A1 | 1/2008 | Atherton et al. |
| 2008/0140502 | A1 | 6/2008 | Birnholz et al. |
| 2009/0187477 | A1 | 7/2009 | Bardin et al. |
| 2010/0146380 | A1* | 6/2010 | Rousso ............... G06Q 30/02 715/234 |
| 2015/0278348 | A1* | 10/2015 | Paruchuri ........... G06F 16/9535 707/771 |

FOREIGN PATENT DOCUMENTS

| | | | | |
|---|---|---|---|---|
| KR | 10-2007-0117391 | | 12/2007 | |
| WO | 97/21183 | | 6/1997 | |
| WO | WO-2007142421 | A1 * | 12/2007 | ............. G06Q 30/02 |
| WO | WO2009092026 | | 8/2015 | |

OTHER PUBLICATIONS

95/001,061, Sep. 3, 2002, Reexamination of Stone et al.
95/001,069, Jul. 11, 2002, Reexamination of Dean et al.
95/001,068, Dec. 7, 2002, Reexamination of Stone et al.
Adforce, Inc., A Complete Guide to AdForce, Version 2.6, 1998.
Adforce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
AU Examination Report No. 1 from AU Application No. 2009206010 dated Mar. 13, 2013, 3 pages.
AU Notice of Acceptance in Australian Application No. 2009206010, dated Oct. 16, 2013, 2 pages.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
CA Office Action in Canadian Application No. 2712322, dated Jun. 6, 2017, 5 pages.
CA Office Action in Canadian Application No. 2712322, dated Aug. 27, 2015, 4 pages.
CA Office Action in Canadian Application No. 2712322, dated Oct. 16, 2016, 4 pages.
CA Office Action issued in Canadian Application No. 2712322, dated Jun. 21, 2018, 5 pages.
Dedrick, R., A Consumption Model for Targeted Electronic Advertising, Intel Architecture Labs, IEEE, 1995.
Dedrick, R., Interactive Electronic Advertising, IEEE, 1994.
EP Communication from EP Application No. 09701900.4 dated Oct. 5, 2012, 6 pages.
EP Search Report from EP Application No. 09701900.4 dated Aug. 23, 2012, 6 pages.
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
Journal Officiel de l'Office Europeen des Brevets. Official Journal of the European Patent Office. Amtsblatt EPA des Europaeischen Patentamts, OEB, Munchen, DE, vol. 30, No. 11, Nov. 1, 2007, pp. 592-593.
Notification of Transmittal of the International Search Report and the Written Opinion of the International Searching Authority, or the Declaration, for Application No. PCT/US2009/031316, dated Jul. 31, 2009, 12 pages.
Neo, et al. "The PC as Multimedia Communication Tool: Connputinnes, 2* Edition]." New Straits Times: 43, dated Jun. 10, 1999.
PCT International Preliminary Report on Patentability from International Application No. PCT/US2009/031316 dated Jul. 29, 2070, 7 pages.
Request for Reexamination of U.S. Pat. No. 6,446,045 B1, Control No. 95/001,061.
Request for Reexamination of U.S. Pat. No. 6,829,587 B2, Control No. 95/001,068.
Request for Reexamination of U.S. Pat. No. 7,240,025 B2, Control No. 95/001,073.
Request for Reexamination of U.S. Pat. No. 7,249,059 B2, Control No. 95/001,069.
Shen, Si, et al., "Mobile Ads V4 Product Plan", Google.com [online]. Dec. 2006 [retrieved on Mar. 29, 2007], Retrieved from the Internet: <URL:https://writely.corp.google.com/View?docid=cggbpf4n_0gpdd86>, 8 pages.
Zeff, R. et al., Advertising on the Internet, 2nd Ed., John Wiley & Sons, 1999.
Zhang et al., "An integrated live interactive content insertion system for digital TV commerce," Fourth International Symposium on Multimedia Software Engineering, Dec. 2002, pp. 286-293.

* cited by examiner

UNIVERSAL AD CREATIVE

CROSS-REFERENCE TO RELATED APPLICATION

This application is a continuation application of U.S. application Ser. No. 16/021,221, filed Jun. 28, 2018, which is a continuation application of U.S. application Ser. No. 12/016,606, now abandoned, filed Jan. 18, 2008. The disclosure of each of the foregoing applications is incorporated herein by reference.

TECHNICAL FIELD

The subject matter of this specification is generally related to user interfaces.

BACKGROUND

Interactive media (e.g., the Internet) has great potential for improving the targeting of advertisements ("ads") to receptive audiences. For example, some websites provide information search functionality that is based on keywords entered by the user seeking information. This user query can be an indicator of the type of information of interest to the user. By comparing the user query to a list of keywords specified by an advertiser, it is possible to provide targeted ads to the user. An example of such a system is AdWords™ offered by Google, Inc. (Mountain View, California).

In a conventional advertisement creation process, an advertiser selects a type of advertisement (e.g., a text advertisement, an image advertisement, or a video advertisement) and provides content specific to the selected advertisement type. The content can be entered, for example, in a form presented to the advertiser by an advertising system. Generally, if the advertiser wishes to generate another advertisement of a second advertisement type, the advertiser needs to repeat the advertisement creation process using a different form for the second advertisement type. Requiring the advertiser to repeat the advertisement creation process for each advertisement type is inefficient and typically means the advertiser has to provide the same content multiple times. Repeating unnecessary steps may deter an advertiser from buying multiple advertisements of different advertisement types.

SUMMARY

In general, one aspect of the subject matter described in this specification can be embodied in methods that include the actions of receiving a selection and data entered in an electronic form, the selection being for two or more different advertisement types, the entered data being of one or more data types, the data types including text, image, audio, or video, generating two or more advertisement creatives using the entered data, the two or more advertisement creatives being for the selected two or more different advertisement types, and presenting the two or more advertisement creatives.

These and other embodiments can optionally include one or more of the following features. Each advertisement creative can be for one of a local business advertisement, a mobile advertisement, a text advertisement, an image advertisement, an audio advertisement, or a video advertisement. The electronic form can be presented for entering data. Presenting the electronic form for entering data can include presenting a sample advertisement. The electronic form can include one or more fields for entering data, where the one or more fields correspond to sample data in the sample advertisement. Presenting the electronic form for entering data can include presenting one or more user interface elements for selection, where the user interface elements are operable for receiving user input. Input selecting a user interface element can be received, where the user interface element is associated with an advertisement type, and a sample advertisement can be presented, where the sample advertisement is of the advertisement type associated with the selected user interface element. Generating two or more advertisement creatives using the entered data can include generating the two or more advertisement creatives based on the entered data and additional data. A user type of a first user entering data in the electronic form can be determined, and the additional data can be selected based on the user type of the first user, where the additional data is associated with one or more other users, and the one or more other users are of the user type of the first user. The entered data can include an identifier for a content source, and the additional data can include content from the content source. The identifier can be one of a Uniform Resource Identifier, a Uniform Resource Locator, or an alias address. Generating two or more advertisement creatives using the entered data can include generating the two or more advertisement creatives based on the one or more data types of the entered data. Input can be received to modify at least one advertisement creative of the two or more presented advertisement creatives, and the at least one advertisement creative can be modified according to the received input. Input can be received to accept or reject at least one advertisement creative of the two or more presented advertisement creatives.

In general, in one aspect, a method is provided. The method includes receiving input from an advertiser specifying a first advertisement having a first media type, providing to the advertiser a first advertisement creative for the first media type, and recommending to the advertiser a second advertisement creative for a second media type that differs from the first media type.

These and other embodiments can optionally include one or more of the following features. An electronic form for receiving input from the advertiser can be presented. Each of the first and second advertisement creatives can be for one of a local business advertisement, a mobile advertisement, a text advertisement, an image advertisement, an audio advertisement, or a video advertisement. Recommending to the advertiser a second advertisement creative for a second media type can include presenting a sample advertisement having the second media type. Data from the advertiser can be received for generating the first advertisement, and the first and second advertisement creatives can be generated based on the entered data and additional data. A user type of the advertiser can be determined, and the additional data can be selected based on the user type of the advertiser, where the additional data can be associated with one or more other advertisers of the same user type. The received data can include an identifier for a content source, and the additional data can include content from the content source. The identifier can be one of a Uniform Resource Identifier, a Uniform Resource Locator, or an alias address. Data from the advertiser can be received for generating the first advertisement, and the second media type can be determined based on one or more data types of the received data. Input can be received from the advertiser accepting, modifying, or rejecting at least one of the first and second advertisement creatives.

Particular embodiments of the subject matter described in this specification can be implemented to realize one or more of the following advantages. A unified user interface for receiving content for one advertisement can be used to generate multiple advertisements of different advertisement types. The unified user interface simplifies the advertisement creation process by minimizing the amount of data that an advertiser needs to provide to generate different types of advertisements. The streamlined user interface provides a user-friendly way of opting into multiple advertisement types. An advertiser can provide content without specifying the type of advertisement to be generated. If an advertiser specifies a particular advertisement type, additional advertisement types can be recommended to the advertiser. The additional advertisement types can be identified based on content provided by the advertiser, the type of content provided by the advertiser, content available on the advertiser's webpage, or historical data associated with the advertiser or other advertisers.

The details of one or more embodiments of the subject matter described in this specification are set forth in the accompanying drawings and the description below. Other features, objects, and advantages of the subject matter will be apparent from the description, the drawings, and the claims.

DESCRIPTION OF DRAWINGS

Like reference symbols in the various drawings indicate like elements.

DETAILED DESCRIPTION

Figure 1:
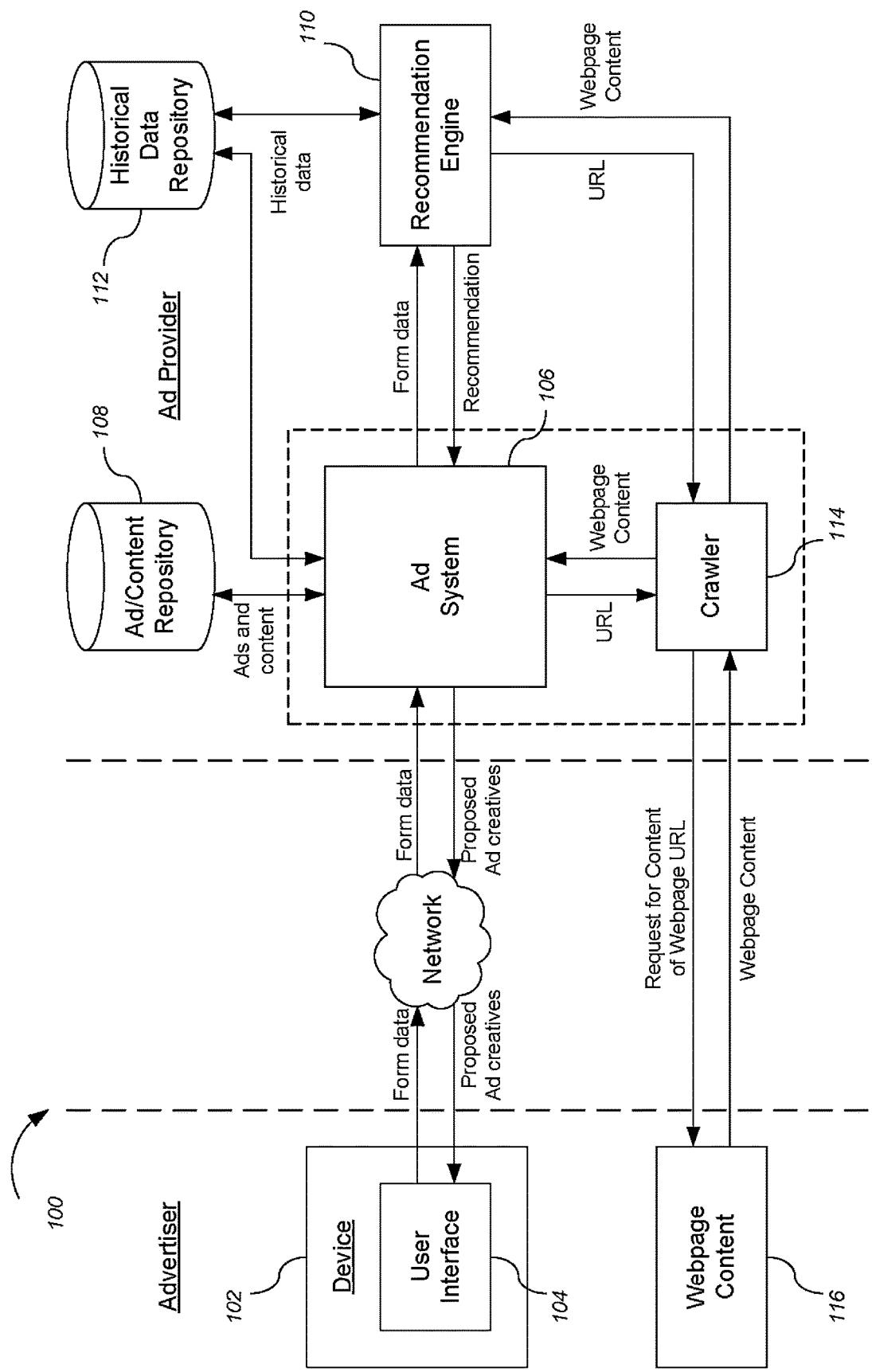
FIG. 1 is a block diagram of an example system that can be used to generate one or more advertisements corresponding to one or more advertisement creatives.

FIG. 1 is a block diagram of an example system 100 that can be used to generate one or more advertisements corresponding to one or more advertisement creatives. In general, when a user enters an internet search, results are displayed. For example, a user can enter a keyword search to locate web sites corresponding to the entered keywords. As another example, a user can search for a location on an online map using an address, name, keywords, or other search parameters. In some implementations, relevant advertisements can also be displayed with the corresponding search results. Typically, an advertisement creative (referred to herein as an "ad creative") is the content of an advertisement as the content will appear in the completed advertisement. For example, an ad creative can be used to generate an advertisement that includes a portion of text, an image, audio, a video, other data types, or combinations thereof. An ad creative can also define a layout for the completed advertisement. In general, the ad creative can be used for a local business advertisement, a mobile advertisement, a text advertisement, an image advertisement, an audio advertisement, a video advertisement, or other types of advertisements.

Referring to FIG. 1, an advertiser can use a device 102 that includes a user interface 104. The device 102 can be a mobile device, desktop computer, laptop computer, handheld computer, or any other computing device or display device that can display the user interface 104. Typically, the user interface 104 is presented to a user (e.g., an advertiser) of device 102 by an advertising system 106. For example, the advertising system 106 can present a web page that presents the user interface 104. In general, the user interface 104 includes one or more user interface forms that can be used to enter data. For example, the user interface 104 can include one or more user interface elements operable for receiving user input, such as text fields, check boxes, buttons (e.g., radio buttons and other buttons), or sliders, and preview areas that the advertiser can utilize to enter data corresponding to an ad creative. Moreover, the user interface 104 allows the advertiser to view one or more proposed advertisements generated from the entered data. The user interface 104 is described in more detail in reference to FIGS. 4 and 5.

The advertising system 106 can be configured to receive data corresponding to one or more ad creatives from the user interface 104. For example, the device 102 can connect to a network (e.g., a LAN, MAN, WAN, or the Internet) and transmit data provided to the user interface 104, such as text, an audio clip, a video clip, or other data. In response to receiving data corresponding to an ad creative, the advertising system 106 can identify relevant advertisements by using one or more of an ad/content repository 108, a recommendation engine 110, a historical data repository 112, and a crawler 114.

The ad/content repository 108 can be used to store advertisements and other relevant content. In general, the ad/content repository 108 can store one or more advertisements generated by the advertising system 106 corresponding to data received from the device 102. For example, the ad/content repository 108 can store a local business advertisement corresponding to data entered into the user interface 104. The advertisement or content from the advertisement can be stored as a fragment of source code (e.g., Hypertext Markup Language (HTML), JavaScript™, or other source code), an image, text, or other forms of data. Though reference is made to advertisements, other forms of content can be served.

The recommendation engine 110 is an optional component that can recommend additional advertisement types based on information stored in the historical data repository 112 or information provided by the crawler 114, to name two examples. In general, the recommendation engine 110 can analyze various information sources and determine if one or more additional advertisement types may be useful to the advertiser. For example, if the advertiser provides text with an icon by way of device 102 for a text advertisement, the recommendation engine may additionally recommend an image advertisement. As another example, if an advertiser submits data for an image advertisement, the recommendation engine 110 can recommend other advertisements types (e.g., an audio advertisement, a video advertisement, or both), based on information stored in the historical data repository 112. The recommendation engine 110 is described in more detail in reference to FIG. 2.

The historical data repository 112 contains information regarding various advertisements. For example, the historical data repository 112 can include information regarding types of advertisements, the information contained in each advertisement or types of advertisements, the number of times an advertisement has been displayed, the number of times an advertisement has been selected (e.g., clicked on), and other information about advertisements. In some implementations, the stored information can be used to reduce the amount of effort needed by the advertisers to generate a particular advertisement. For example, the historical data repository 112 can automatically provide contact information for an advertiser based on stored information (e.g., for a previously created advertisement for the same advertiser) in the historical data repository 112. In this way, the advertiser is not required to enter the information a second time. As another example, the historical data repository 112 can provide information to the recommendation engine 110 regarding the types of advertisements used in a particular industry. The recommendation engine 110 can use this information to provide recommendations regarding additional advertisement types. For example, the historical data repository 112 can provide the number of clicks generated by different types of advertisements, which the recommendation engine 110 can use to generate recommendations for additional advertising types to an advertiser submitting ad data using system 100.

The crawler 114 can generate requests for webpage content corresponding to a universal resource locator (URL), e.g., for an advertiser's web page. In general, the crawler 114 can extract relevant information from one or more web pages and automatically provide missing data in ad creatives or populate some or all of one or more sample advertisements. For example, if the advertiser only enters a URL into user interface 104, the crawler can access the web page specified by the URL and extract text, images, audio, video, or other relevant webpage content. The crawler 114 can provide the extracted content to either the advertising system 106 or the recommendation engine 110, or both.

Figure 2:
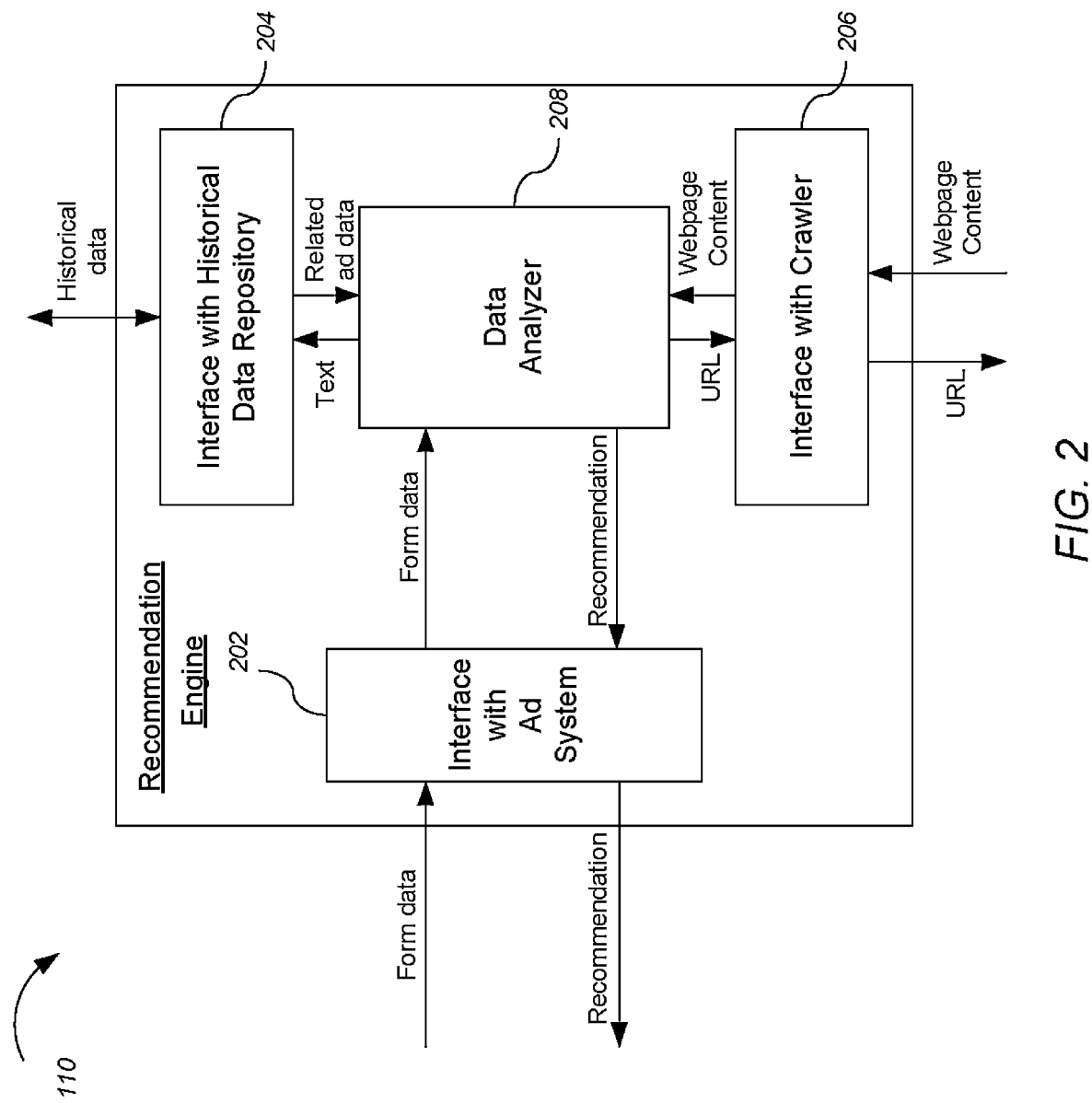
FIG. 2 is an example block diagram of the recommendation engine of FIG. 1.

FIG. 2 is an example block diagram of the recommendation engine 110 of FIG. 1. In general, the recommendation engine 110 can communicate with the advertising system 106, the historical data repository 112, and the crawler 114 through interfaces 202, 204, and 206, respectively. The interfaces 202-206 can be programmatic interfaces, such as an application program interface (API), for example. Typically, these interfaces 202-206 allow a data analyzer 208 to receive information, determine one or more recommendations regarding additional potential advertisement types, and transmit the one or more recommendations to the advertiser by way of the advertising system 106. In some implementations, recommendations of advertisement types are presented to an advertiser as one or more proposed advertisement creatives for the recommended advertisement types. The advertising system 106 can receive input from the advertiser accepting or rejecting one or more of the advertisement creatives.

By way of a non-limiting example, when new data (e.g., form data) corresponding to an advertisement are received from the advertising system 106, the advertising system 106 can transmit the form data using interface 202 to the data analyzer 208. The data analyzer 208 can determine if there is enough information to generate a recommendation. In general, the data analyzer 208 can process the form data received from the advertising system 106 to determine possible additional advertisement types. For example, if the data analyzer 208 receives a video clip for a video advertisement, the data analyzer 208 can process the video's metadata to determine if text-based or imaged-based advertisement data or both are available and whether a text advertisement or an image advertisement or both can be recommended.

In some scenarios, there may not be enough relevant information to generate a recommendation. If a recommendation cannot be made from form data alone, then the data analyzer 208 can retrieve additional information from the historical data repository 112, the crawler 114, or both which can be combined with the form data to generate a recommendation. For example, if the data analyzer 208 determines that additional related information is needed to generate a recommendation, the data analyzer 208 can parse the received form data and transmit text corresponding to a type of business, location, or other text to the historical data repository 112 using interface 208. The data analyzer 208 can determine related information (e.g., related ad data) and retrieve the related information from the historical data repository 112. The data analyzer 208 can use the related information to generate a recommendation. In some implementations, the data analyzer 208 may receive information corresponding to advertisements used by other advertisers of the same or similar business types and may recommend additional advertisement types corresponding to the received information. For example, if many restaurants include one or more image advertisements displaying food offerings, the data analyzer 208 may recommend a similar advertisement to a restaurant advertiser that submits data corresponding to a text ad.

In some implementations, the data analyzer 208 may also determine that additional information regarding an advertiser's webpage content may be useful for generating a recommendation. For example, if the data analyzer 208 determines that more information for a particular advertisement type is needed and might be available from the webpage, the data analyzer can transmit the URL to the crawler 114 using interface 206. In response, the crawler 114 can extract information from the respective webpage and transmit webpage content to the data analyzer 208 using interface 206. The data analyzer 208 can use the extracted webpage content to generate a recommendation. For example, if data for a text advertisement are received, and an image is located on the corresponding webpage, the data analyzer 208 may recommend an additional image advertisement to the advertiser.

The data analyzer 208 may determine an order to retrieve information from the advertising system 106, the historical data repository 112, and the crawler 114 based on the type and the level of detail of the information retrieved. For example, if the form data are sparse, or is otherwise lacking in information, the data analyzer 208 can use the available information to obtain additional information. For example, if the available form data include a URL, the data analyzer 208 may determine to first request webpage content from the crawler 114 and then use the received content to generate a second request for historical data from the historical data repository 112. In other words, the data analyzer 208 can use the received webpage content to determine a location, business type, or other information as the basis for the request to the historical data repository 112. As another example, if the available form data does not include a URL, but includes other identifying information such as a business name, address, phone number, or other relevant information, the data analyzer 208 may determine to first request additional information (e.g., URL or other information) from the historical data repository 112, using the identifying information. In response, the data analyzer 208 can transmit the received URL as a second request for webpage content from the crawler 114.

Figure 3:
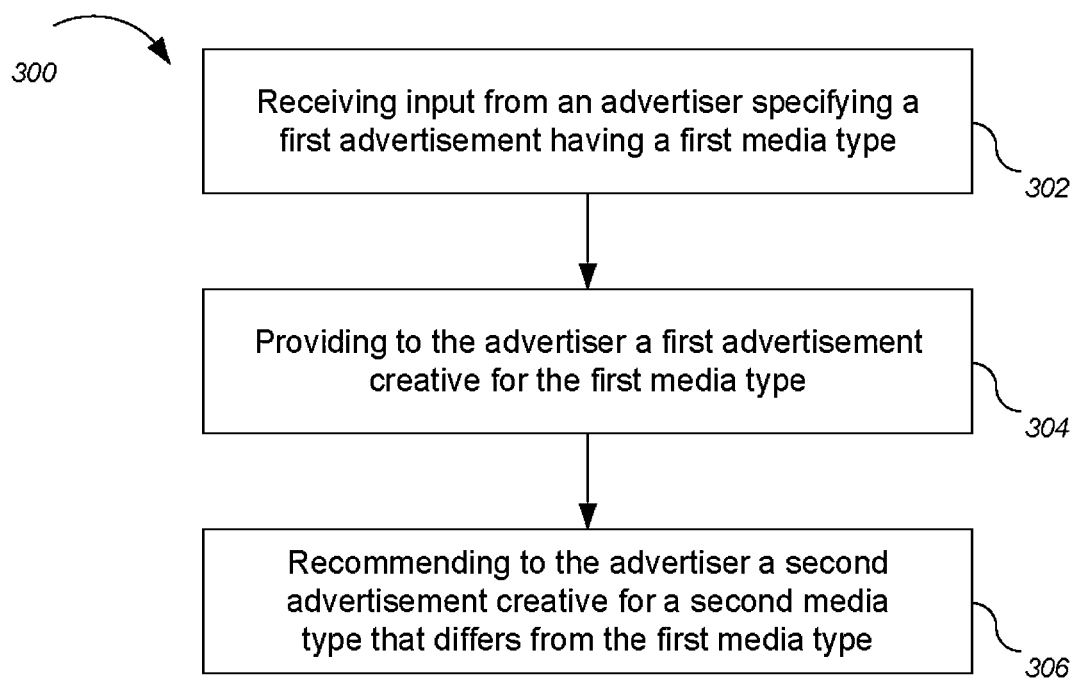
FIG. 3 is a flow chart of an example process for recommending multiple advertisement creatives.

FIG. 3 is a flow chart of an example process 300 for recommending multiple advertisement creatives. In general, the example process 300 can be executed any number of times to provide multiple advertisement recommendations. In step 302, input is received (e.g., at the advertising system 106 from an advertiser) specifying a first advertisement having a first media type. Media types for an advertisement include, for example, text, image, audio, and video. Typically, the input is received from a user interface. For example, form data can be received by advertising system 106 by way of user interface 104.

In step 304, in response to receipt of the received input, an advertising creative is produced of a first media type (e.g., the advertising system 106 can produce and provide the ad creative to the advertiser). In general, the first advertisement creative is generated from the data received from the advertiser. In other words, the advertising system 106 can use the form data to generate an advertisement creative. For example, the advertising system 106 can use received data to generate an advertisement creative for a local business advertisement, a mobile advertisement, a text advertisement, an image advertisement, an audio advertisement, a video advertisement, or other types of advertisements. In some implementations, the advertisement creative is generated from any or all of the data entered by the advertiser, and information obtained from the historical data repository 112, the crawler 114, and combinations thereof.

In step 306, a recommendation is made for a second advertisement creative of a second media type (e.g., the advertising system 106 recommends a second advertisement creative for a second media type to the advertiser) that differs from the first media type. For example, the data analyzer 208 can reference the historical data repository 112 to determine ads of other advertisers in substantially similar industries and recommend advertisement types that those businesses have submitted to the advertising system 106. As another example, the data analyzer 208 can determine from webpage content obtained from the crawler 114 if additional advertisement materials are available on the webpage and recommend additional advertisement types corresponding to the materials located therein.

In some implementations, certain steps of the example process 300 can be executed more than once based on the amount of information received in step 302. For example, if the data entered includes enough information for recommendation engine 208 to generate multiple advertisement recommendations each with a different advertisement type, then step 306 can be iteratively executed until the recommendation engine 208 has determined that all potential advertisement types, based on the available information, have been recommended. In some implementations, the steps can be batch processed. For example, in step 302, more than one input specifying more than one advertisement can be received corresponding to more than one media type. In subsequent steps 304 and 306, the batched input can be used to iteratively execute the respective steps. For example, step 304 can be iteratively executed to provide advertisement creatives to the advertiser corresponding to each of the batched inputs. As another example, in step 306, the data analyzer 208 can iteratively analyze each of the inputs before generating a recommendation of an advertisement having a media type that is different than the media type of the batched inputs. In some implementations, the steps can be executed in parallel. For example, in step 304, while the advertising system 106 provides the advertiser with the first advertisement creative, step 306 can be executed in parallel by the recommendation engine 110.

Figure 4:
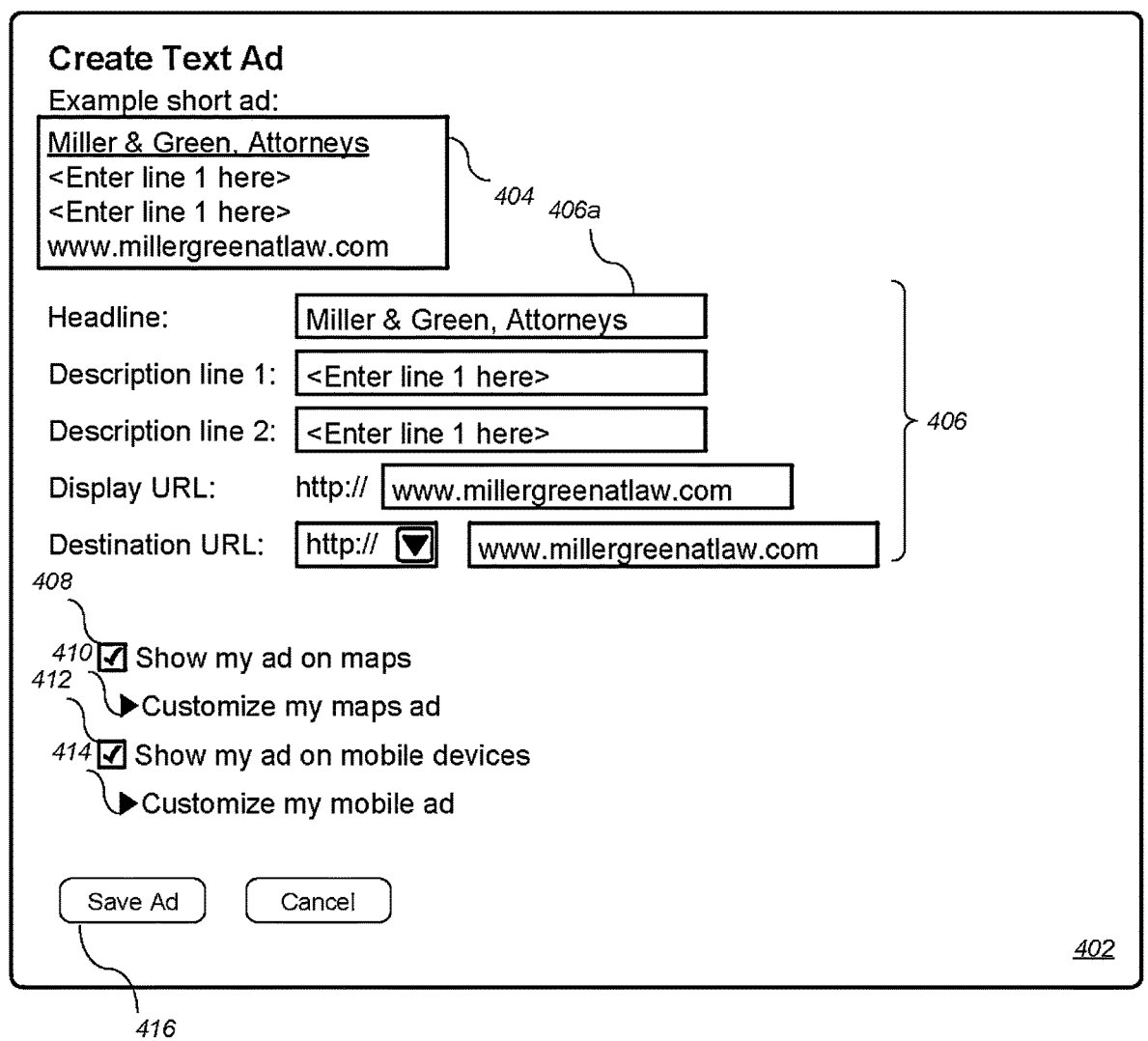
FIGS. 4 and 5 are screen shots of example user interfaces that can be used to enter advertisement data.
Figure 5:

FIGS. 4 and 5 are screen shots of example user interfaces 400 and 500, respectively. The user interfaces 400 and 500 can be used to enter ad data, preview sample advertisements, or both. In general, the user interfaces 400 and 500 can be generated in a web browser (e.g., using HTML) or in an application running on device 102, to name two examples. The example user interfaces 400 and 500 illustrate the entry of data related to text ads; however, other substantially similar user interfaces can be used to enter data corresponding to audio advertisements, video advertisements, image advertisements, and other advertisements.

In reference to FIG. 4, the user interface 400 includes a form 402 (e.g., an electronic form). The form 402 can include an advertisement creative, e.g., for a text advertisement. In some implementations, the form 402 is a universal form for any or all advertisement types. This universal form can be presented to a user, for example, if the user has not specified an advertising type. The form includes various user interface components that can be used to display a preview advertisement and enter data corresponding to an advertisement. For example, preview area 404 displays a sample advertisement based on information entered into data entry components 406. Typically, the preview area 404 is updated in real-time as data in components 406 are added or amended. In addition, user interface form 402 includes check boxes 408 and 412 and buttons 410 and 414 that can display expandable forms (e.g., the expandable form 502 described in reference to FIG. 5) when selected. The check boxes 408 and 412 specify the additional ways in which data entered in the form 402 can be presented as an advertisement. For example, check box 408 can be used to specify if an advertisement using the entered data should be shown on maps (e.g., shown when a user searches an interactive map, such as Google Maps™). As another example, check box 412 can be used to specify if an advertisement using the entered data should be shown on mobile devices. In some implementations, these check boxes modify the expense associated with publishing the advertisement. If the user selects the save ad button 416, the device 102 transmits the form data to the advertising system 106, which in turn can use the received form data to generate recommendations, as described in reference to FIG. 3.

In reference to FIG. 5, the user interface 500 can be displayed by selecting the check box 408 for a map advertisement. For example, the form 402 expands to display a user interface form 502. The form 502 can include a second advertisement creative, e.g., for a map advertisement. The user interface form 502 can include a preview area 504 that displays a sample of how the map advertisement may appear when displayed with a map. For example, preview area 504 can display a map advertisement that may appear as part of a list along with other map advertisements displayed next to a map. In addition, the preview area 506 can display another sample map advertisement that corresponds to the previously entered information. For example, the preview area 506 can display a map advertisement that may appear as an overlay over a displayed map, e.g., when a user selects the associated map advertisement from the list of map advertisements displayed next to the map. Moreover, the user interface form 502 has additional user interface components 508 that can be used to modify data corresponding to the map advertisement. In general, some or all of the displayed data in components 508 may be derived from information entered in form 402. For example, component 508a includes data that was derived from a similar data entry field (e.g., data entry field 406a) in data entry components 406. In some implementations, the component 508a is disabled (e.g., as indicated by shading) if the included data is not allowed to differ from the corresponding data in data entry components

406. The advertiser can modify component 508*a* by modifying the contents of component 406*a*. As another example, the optional components displayed with components 508 can be used to modify information that was determined by using information from the historical data repository 112, retrieved by the crawler 114, or determined in other ways.

Figure 6:
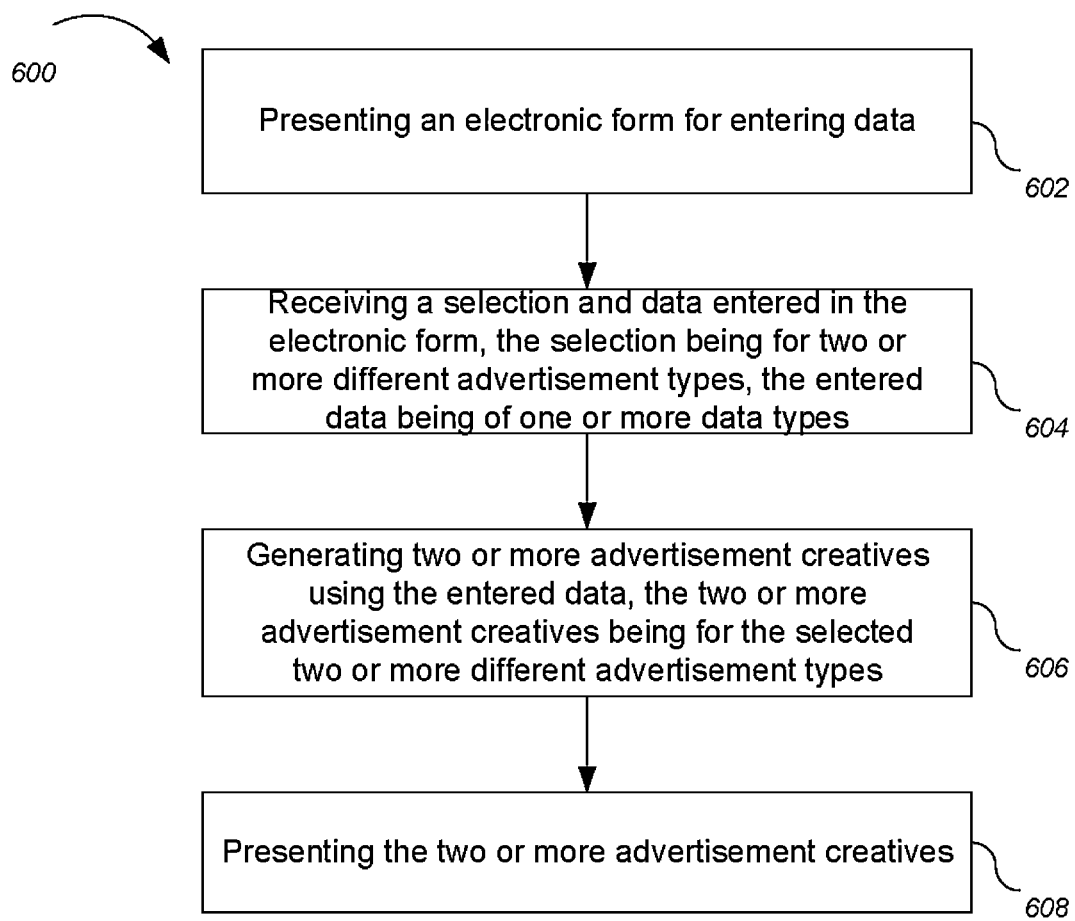
FIG. 6 is a flow chart of an example process for generating two or more advertisement creatives.

FIG. 6 is a flow chart of an example process 600 for generating two or more advertisement creatives. In general, the example process 600 can be executed any number of times to generate any number of advertisement creatives. Typically, the example process 600 is implemented in an advertising system, e.g., advertising system 106 of FIG. 1.

In step 602, an electronic form is presented that can be used to enter data, e.g., content for an advertisement, data specifying a layout for an advertisement, or both. For example, the advertising system 106 can present form 402 to a user (e.g., an advertiser) on device 102 in user interface 104.

In step 604, a selection and data entered in the electronic form is received. The selection is for two or more different advertisement types. The entered data is of one or more data types, including text, image, audio, or video.

In step 606, two or more advertisement creatives are generated using the received data. The two or more advertisement creatives are for the selected two or more different advertisement types. For example, each advertisement creative can be for one of a local business advertisement (e.g., a map advertisement), a mobile advertisement, a text advertisement, an image advertisement, an audio advertisement, or a video advertisement. The advertising system 106 can transmit the received data to the recommendation engine 110. The recommendation engine 110 can determine additional advertisement types and provide recommendations to the advertising system 106. In response, the advertising system 106 can generate additional advertisement creatives from the received recommendations.

In step 608, the two or more advertisement creatives are presented, e.g., to the user. For example, the advertising system 106 can transmit the advertisement creatives to device 102 which displays the advertisement creatives in user interface 104. In response, the user can select any or all of the advertisement creatives. In some implementations, the user can modify any or all of the advertisement creatives. In some implementations, an advertisement corresponding to each of the two or more advertisement creatives is automatically generated, and the user is allowed to opt-out of (e.g., reject) any or all of the generated advertisements.

In some implementations, only one advertisement creative is generated using the entered data, where the one advertisement creative is for two or more different advertisement types. For example, the one advertisement creative can be a universal advertisement creative that includes content for the two or more different advertisement types. As an example, the user interface 500 of FIG. 5 can include a universal advertisement creative. A universal advertisement creative can include sample advertisements for multiple advertisement types.

In some implementations, a user type of the user entering the data is determined. For example, the advertising system 106 can determine that the user is a real estate agent or a restaurant owner. The two or more advertisement creatives can be generated based on the entered data and additional data, where the additional data is selected based on the user type. For example, the additional data can be associated with one or more other users that are of the same user type or a similar user type as the user. In one example, if the user entering the data is a real estate agent, additional data used for generating the advertisement creatives might include a graphic of a "sold" sign that other real estate agents have used in their advertisements. The additional data associated with the other users can also include, for example, advertisement statistics, advertisement keywords, advertisement types, and advertisement layouts.

Figure 7:
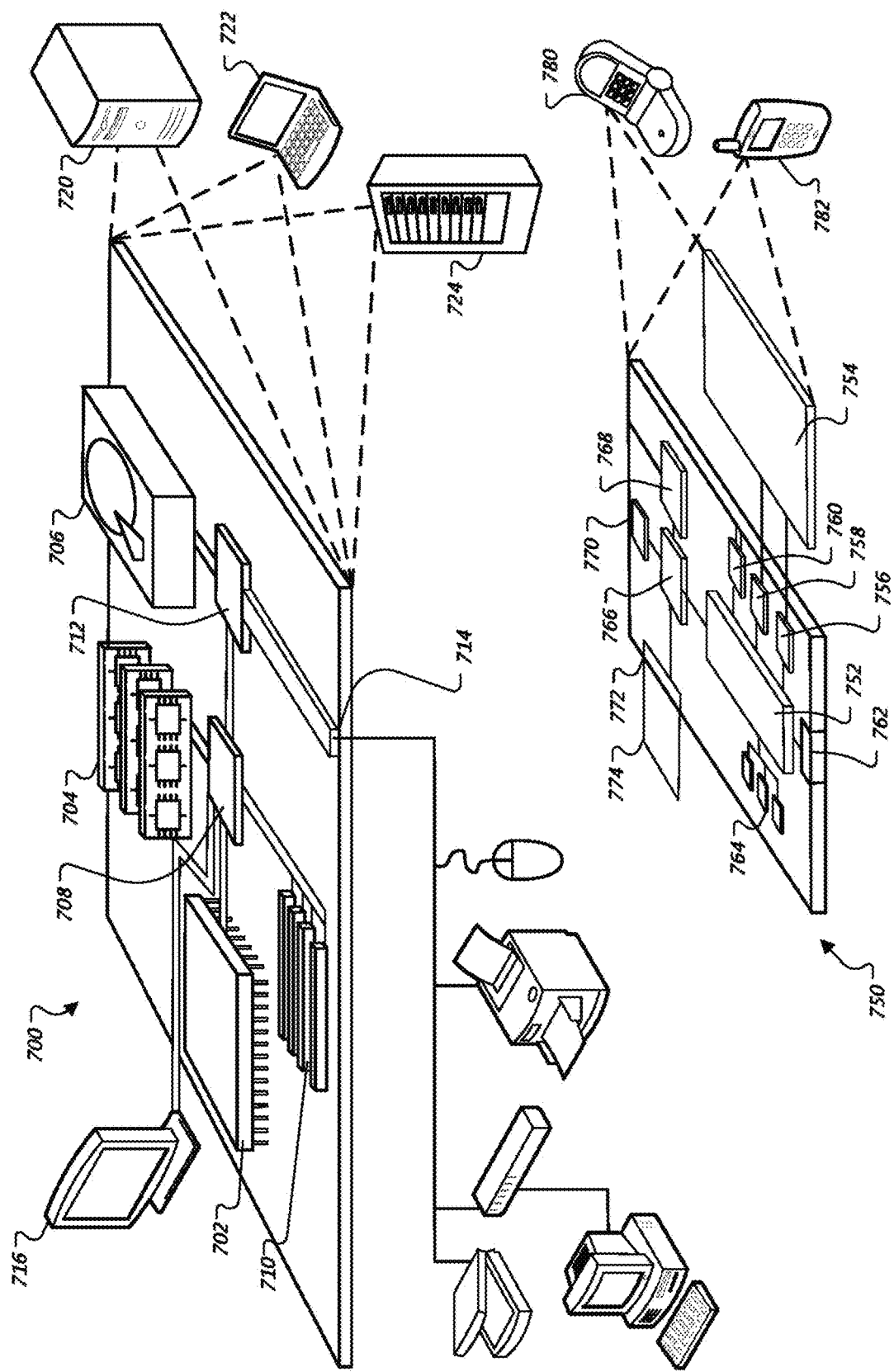
FIG. 7 is a block diagram of generic computing devices.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the subject matter described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.), and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
   providing, by one or more computing devices and to a content provider, a user interface through which the one or more computing devices receives graphic content including one or more of video content or image content submitted by a content provider;
   receiving, through the user interface, textual content from the content provider;
   accessing, by the one or more computing devices, one or more web pages containing additional information;
   creating, by the one or more computing devices, multiple different combinations of the graphic content, the textual content, and the additional information;
   generating, by the one or more computing devices, a recommendation of different content to be created, wherein the different content differs from the multiple different combinations of the graphic content, the textual content, and the additional information;
   providing, by the one or more computing devices and through the user interface, the recommendation with an interactive user interface element; and
   receiving, from the content provider, input accepting the recommendation of different content responsive to interaction with the interactive user interface element.

2. The method of claim 1, wherein creating multiple different combinations of the graphic content, the textual content, and the additional information comprises:
   creating a first combination of two or more of the graphic content, the textual content, or the additional information in a mobile presentation format; and
   creating a second combination of at least two of the graphic content, the textual content, or the additional information in a desktop presentation format.

3. The method of claim 2, wherein creating each of the first combination and the second combination comprises creating two different combinations that include a same set of textual content.

4. The method of claim 3, further comprising:
   updating at least one of the first combination or the second combination when the graphic content is modified.

5. The method of claim 4, wherein:
   the textual content includes a universal resource locator; and
   creating the multiple different combinations of the graphic content comprises creating the multiple different combinations of the graphic content using online content accessed by a web crawler accessing a website of the universal resource locator.

6. The method of claim 5, further comprising presenting one or more previews of at least one of the multiple different combinations of the graphic content based on historical data indicating previous content interactions by users.

7. The method of claim 6, wherein presenting one or more previews comprises:
   presenting at least two of the multiple different combinations of the graphic content, wherein one of the multiple different combinations of the graphic content is identified mobile content formatted for presentation on a mobile device;
   facilitating acceptance of the at least two of the multiple different combinations of graphic content within a single streamlined user interface, wherein receiving the input accepting the recommendation of different content comprises receiving input generated based on user interaction with a user interface element corresponding to at least two of the multiple different combinations of graphic content in the single streamlined user interface; and
   presenting each accepted combination of graphic content, including presenting the mobile content.

8. A system comprising:
one or more computing devices; and
one or more storage devices storing instructions that, when executed by the one or more computing devices, cause the one or more computing devices to perform operations comprising:
providing, a content provider, a user interface through which the one or more computing devices receives graphic content including one or more of video content or image content submitted by a content provider;
receiving, through the user interface, textual content from the content provider;
accessing one or more web pages containing additional information;
creating multiple different combinations of the graphic content, the textual content, and the additional information;
generating a recommendation of different content to be created, wherein the different content differs from the multiple different combinations of the graphic content, the textual content, and the additional information;
providing, through the user interface, the recommendation with an interactive user interface element; and
receiving, from the content provider, input accepting the recommendation of different content responsive to interaction with the interactive user interface element.

9. The system of claim 8, wherein creating multiple different combinations of the graphic content, the textual content, and the additional information comprises:
creating a first combination of two or more of the graphic content, the textual content, or the additional information in a mobile presentation format; and
creating a second combination of at least two of the graphic content, the textual content, or the additional information in a desktop presentation format.

10. The system of claim 9, wherein creating each of the first combination and the second combination comprises creating two different combinations that include a same set of textual content.

11. The system of claim 10, wherein the instructions cause the one or more computing devices to perform operations further comprising:
updating at least one of the first combination or the second combination when the graphic content is modified.

12. The system of claim 11, wherein:
the textual content includes a universal resource locator; and
creating the multiple different combinations of the graphic content comprises creating the multiple different combinations of the graphic content using online content accessed by a web crawler accessing a website of the universal resource locator.

13. The system of claim 12, wherein the instructions cause the one or more computing devices to perform operations further comprising presenting one or more previews of at least one of the multiple different combinations of the graphic content based on historical data indicating previous content interactions by users.

14. The system of claim 13, wherein:
presenting one or more previews comprises; and
the instructions cause the one or more computing devices to perform operations further comprising:
presenting at least two of the multiple different combinations of the graphic content, wherein one of the multiple different combinations of the graphic content is identified mobile content formatted for presentation on a mobile device;
facilitating acceptance of the at least two of the multiple different combinations of graphic content within a single streamlined user interface, wherein receiving the input accepting the recommendation of different content comprises receiving input generated based on user interaction with a user interface element corresponding to the at least two of the multiple different combinations of graphic content in the single streamlined user interface; and
presenting each accepted combination of graphic content, including presenting the mobile content.

15. A non-transitory computer-readable medium storing software comprising instructions executable by one or more computers which, upon such execution, cause the one or more computers to perform operations comprising:
providing, a content provider, a user interface through which the one or more computers receive graphic content including one or more of video content or image content submitted by a content provider;
receiving, through the user interface, textual content from the content provider;
accessing one or more web pages containing additional information;
creating multiple different combinations of the graphic content, the textual content, and the additional information;
generating a recommendation of different content to be created, wherein the different content differs from the multiple different combinations of the graphic content, the textual content, and the additional information;
providing, through the user interface, the recommendation with an interactive user interface element; and
receiving, from the content provider, input accepting the recommendation of different content responsive to interaction with the interactive user interface element.

16. The non-transitory computer-readable medium of claim 15, wherein creating multiple different combinations of the graphic content, the textual content, and the additional information comprises:
creating a first combination of two or more of the graphic content, the textual content, or the additional information in a mobile presentation format; and
creating a second combination of at least two of the graphic content, the textual content, or the additional information in a desktop presentation format.

17. The non-transitory computer-readable medium of claim 16, wherein creating each of the first combination and the second combination comprises creating two different combinations that include a same set of textual content.

18. The non-transitory computer-readable medium of claim 17, wherein the instructions cause the one or more computers to perform operations further comprising:
updating at least one of the first combination or the second combination when the graphic content is modified.

19. The non-transitory computer-readable medium of claim 18, wherein:
the textual content includes a universal resource locator; and
creating the multiple different combinations of the graphic content comprises creating the multiple different combinations of the graphic content using online content accessed by a web crawler accessing a website of the universal resource locator.

20. The non-transitory computer-readable medium of claim 19, wherein the instructions cause the one or more computers to perform operations further comprising presenting one or more previews of at least one of the multiple different combinations of the graphic content based on historical data indicating previous content interactions by users.

\* \* \* \* \*